(12) United States Patent
Ezawa

(10) Patent No.: US 12,065,319 B2
(45) Date of Patent: Aug. 20, 2024

(54) TRANSPORT APPARATUS, VACUUM APPARATUS, PROCESSING SYSTEM, AND A METHOD FOR MANUFACTURING AN ARTICLE

(71) Applicant: CANON KABUSHIKI KAISHA, Tokyo (JP)

(72) Inventor: Mitsuharu Ezawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 394 days.

(21) Appl. No.: 17/506,352

(22) Filed: Oct. 20, 2021

(65) Prior Publication Data
US 2022/0135348 A1 May 5, 2022

(30) Foreign Application Priority Data

Oct. 29, 2020 (JP) ................................ 2020-181876

(51) Int. Cl.
*B65G 54/02* (2006.01)
*H02K 1/16* (2006.01)

(52) U.S. Cl.
CPC ............... *B65G 54/02* (2013.01); *H02K 1/16* (2013.01)

(58) Field of Classification Search
CPC . B65G 54/02; H02K 1/16; H02K 1/14; H02K 41/031
See application file for complete search history.

(56) References Cited

U.S. PATENT DOCUMENTS

| 6,713,899 B1* | 3/2004 | Greubel | H02K 41/031 |
| | | | 310/12.18 |
| 6,949,846 B2* | 9/2005 | Sugita | H02K 41/031 |
| | | | 310/12.15 |
| 7,199,492 B2* | 4/2007 | Hashimoto | H02K 41/03 |
| | | | 310/12.25 |

(Continued)

FOREIGN PATENT DOCUMENTS

| DE | 10 2008 064 678 A1 | 3/2011 |
| JP | 61-185286 U | 11/1986 |

(Continued)

OTHER PUBLICATIONS

U.S. Appl. No. 17/498,641, filed Oct. 11, 2021 by Ryuji Kimura et al.

(Continued)

*Primary Examiner* — Mark A Deuble
(74) *Attorney, Agent, or Firm* — VENABLE LLP

(57) ABSTRACT

A transport apparatus comprises: a stator including a plurality of coils arranged along a first direction; and a mover including a first magnet group having a plurality of magnets arranged along the first direction, the plurality of magnets arranged to face the plurality of coils in a second direction crossing the first direction, wherein the mover is driven toward the first direction by a magnetic force generated between the magnets and the coils, wherein the stator includes a first region in which the plurality of coils is arranged at given intervals and a second region adjacent to the first region, and wherein a magnetic compensator is arranged in the second region for compensating changes in magnetic energy distribution characteristics formed by the magnets and the coils in the first region.

23 Claims, 25 Drawing Sheets

(56) References Cited

U.S. PATENT DOCUMENTS

| | | | |
|---|---|---|---|
| 8,397,896 B2* | 3/2013 | Kleinikkink | B23Q 7/1447 |
| | | | 198/747 |
| 9,906,110 B2* | 2/2018 | Sommerhalter, Jr. | B65G 54/02 |
| 10,164,555 B1* | 12/2018 | Ozimek | H02M 7/5395 |
| 10,224,797 B2* | 3/2019 | Misawa | H02K 1/34 |
| 10,370,279 B2 | 8/2019 | Ezawa | |
| 2011/0221284 A1* | 9/2011 | Kakihara | H02K 41/031 |
| | | | 310/12.26 |
| 2016/0164395 A1 | 6/2016 | Sommerhalter, Jr. | |
| 2020/0169157 A1* | 5/2020 | Weber | B65G 23/23 |

FOREIGN PATENT DOCUMENTS

| | | |
|---|---|---|
| JP | 11-206100 A | 7/1999 |
| JP | 2015-050828 A | 3/2015 |
| JP | 2016-73164 A | 5/2016 |
| JP | 2020-96514 A | 6/2020 |

OTHER PUBLICATIONS

Japanese Office Action issued May 7, 2024 in corresponding Japanese Patent Application No. 2020-181876 (English translation included).

* cited by examiner

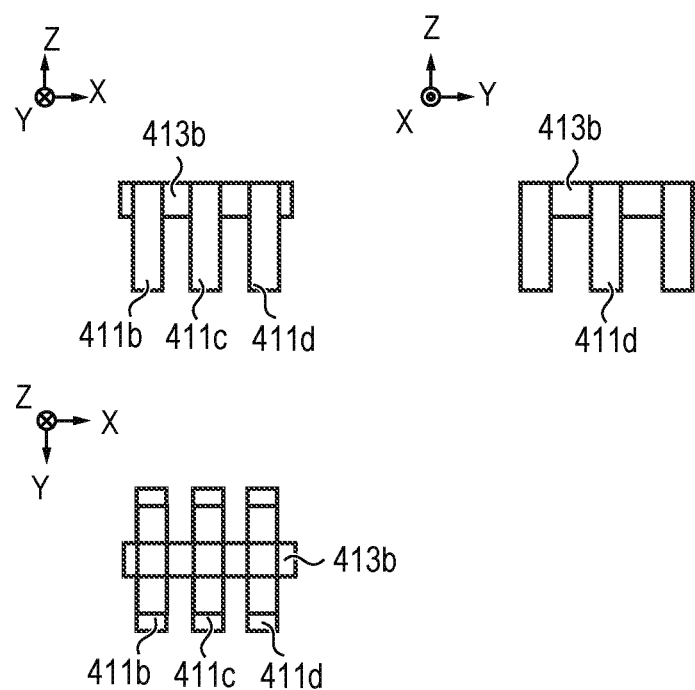

TRANSPORT APPARATUS, VACUUM APPARATUS, PROCESSING SYSTEM, AND A METHOD FOR MANUFACTURING AN ARTICLE

BACKGROUND OF THE INVENTION

Field of the Invention

The present disclosure relates to a transport apparatus, a vacuum apparatus, a processing system, and a method for manufacturing an article.

Description of the Related Art

In general, a transport system is used in, for example, production lines for assembling industrial products, semiconductor exposure devices. In particular, the transport system for the production lines transports workpieces such as parts or components within factory automated production lines or among stations within or between the production lines. The transport system may also be used as a transport apparatus arranged in a processing device. A system using a movable magnet type linear motor has already been proposed as a transport system.

Japanese Patent Application Laid-Open No. 2015-50828 discloses a linear conveyor comprising a fixed side module including a stator having a rail extending linearly and a plurality of armature coils, and a mover having a plurality of magnetic poles that is linearly arranged, and a slider movable along the rail.

However, the linear conveyor disclosed in Japanese Patent Application Laid-Open No. 2015-50828 would have difficulty in smoothly and stably transporting the mover in case that uniformly arranging the armature coils is difficult.

SUMMARY OF THE INVENTION

According to one aspect of the present disclosure, a transport apparatus comprises: a stator including a plurality of coils arranged along a first direction; and a mover including a first magnet group having a plurality of magnets arranged along the first direction, the plurality of magnets arranged to face the plurality of coils in a second direction crossing the first direction, wherein the mover is driven toward the first direction by a magnetic force generated between the magnets and the coils, wherein the stator includes a first region in which the plurality of coils is arranged at given intervals and a second region adjacent to the first region, and wherein a magnetic compensator is arranged in the second region for compensating changes in magnetic energy distribution characteristics formed by the magnets and the coils in the first region.

According to another aspect of the present disclosure, a vacuum apparatus comprises: a vacuum chamber; a valve portion configured to open and close the vacuum chamber; and a transport apparatus arranged inside the vacuum chamber, the transport apparatus comprising: a stator including a plurality of coils arranged along a first direction; and a mover including a first magnet group having a plurality of magnets arranged along the first direction, the plurality of magnets arranged to face the plurality of coils in a second direction crossing the first direction, wherein the mover is driven toward the first direction by a magnetic force generated between the magnets and the coils, wherein the stator includes a first region in which the plurality of coils is arranged at given intervals and the valve portion adjacent to the first region, and wherein a magnetic compensator is arranged in the valve portion for compensating changes in magnetic energy distribution characteristics formed by the magnets and the coils in the first region.

Further features of the present disclosure will become apparent from the following description of exemplary embodiments with reference to the attached drawings.

BRIEF DESCRIPTION OF THE DRAWINGS

FIG. 9 is a schematic diagram showing the auxiliary tooth unit in the transport apparatus according to the fourth embodiment of the present disclosure.

DESCRIPTION OF THE EMBODIMENTS

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

First Embodiment

A transport apparatus according to a first embodiment of the present disclosure will be described with reference to FIGS. 1A to 4B.

Figure 1A:
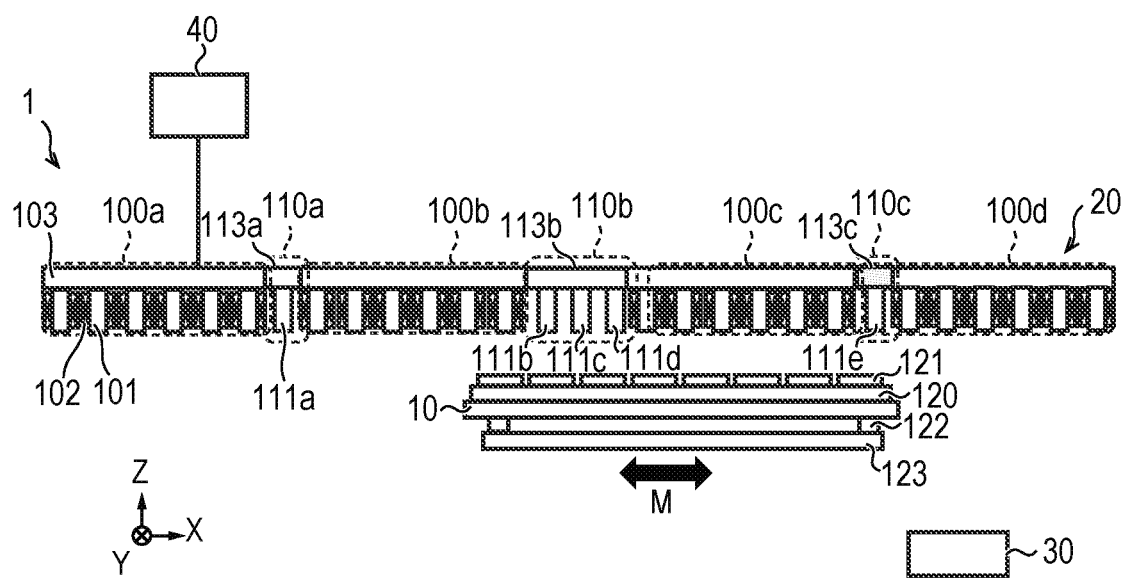
FIG. 1A is a schematic view showing the transport apparatus according to the first embodiment of the present disclosure.
Figure 1B:
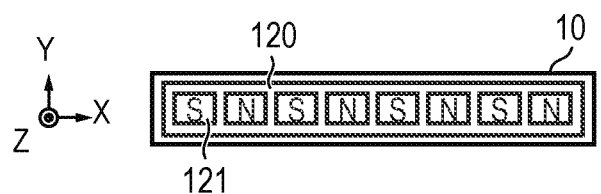
FIG. 1B is a schematic view showing the transport apparatus according to the first embodiment of the present disclosure.
Figure 1C:
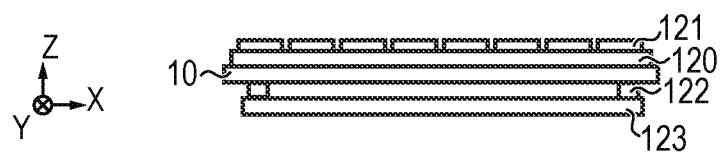
FIG. 1C is a schematic view showing the transport apparatus according to the first embodiment of the present disclosure.
Figure 1D:
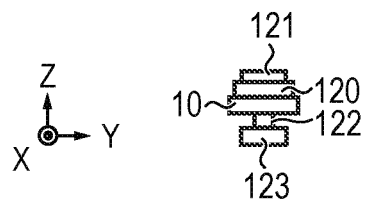
FIG. 1D is a schematic view showing the transport apparatus according to the first embodiment of the present disclosure.

First, a schematic configuration of the transport apparatus 1 according to the present embodiment will be described with reference to FIGS. 1A to 1D. FIG. 1A is a side view showing the transport apparatus 1 according to the present embodiment as viewed from the Y direction, which will be described later. FIG. 1B is a top view showing a mover 10 as viewed from the Z direction described later. FIG. 1C is a side view showing the mover 10 viewed from the Y direction. FIG. 1D is a side view showing the mover 10 as viewed from the X direction described later. Hereinafter, if a component which may be components is not particularly required to identify a specific one, only common numerical symbols are used. If it is necessary to identify a specific component among multiple same components, the specific one is identified by adding a lower-case alphabet letter after the numerical symbols.

As shown in FIG. 1A, the transport apparatus 1 according to the present embodiment includes the mover 10 for holding and transporting a workpiece 123, and a stator 20 for constituting a transporting path along which the mover 10 travels. The transport apparatus 1 according to the present embodiment is a magnetically levitated transport apparatus for traveling and transporting the mover 10 in a magnetically levitated state levitated against gravity by a magnetic force. In the present embodiment, a transport apparatus using a movable magnet type linear motor (moving permanent magnet type linear motor and movable field type linear motor) is shown as an example of the transport apparatus 1, but the transport apparatus 1 may be a transport apparatus using a movable coil type linear motor. The transport apparatus 1 according to the present embodiment constitutes a part of a processing system including a processing device 30 for processing the workpiece 123 transported by the mover 10. The processing system allows to manufacture an article through performing processing by the processing device 30.

The transport apparatus 1 transports the workpiece 123 held by the mover 10 to the processing device 30 that performs processing to the workpiece 123 through transporting the mover 10, for example. The processing device 30 is not particularly limited, but is, for example, a film forming device such as a vapor deposition device or a sputtering device for forming a film on a substrate such as a glass substrate as a workpiece 123. The film forming device such as a vapor deposition device or a sputtering device is arranged in a vacuum apparatus. The film to be formed is, for example, a thin film, and raw material of the thin film is an organic material or a metal material (metal, metal oxide). An article manufactured by forming a film on a substrate such as a glass substrate as a workpiece 123 is, for example, an organic electronic device such as an organic EL display device or a thin film solar cell. The organic EL display device is used for a display panel of a mobile device such as a smartphone, for example.

Here, coordinate axes and directions used in the following descriptions are defined. The X axis is taken along the transporting direction of the mover 10 along the horizontal direction, that is, along the traveling direction of the mover 10, and the transporting direction of the mover 10 is taken as the X direction. An arrow M in FIG. 1A represents the transporting direction of the mover 10 along the X direction. The Z axis is taken along a vertical direction orthogonal to the X direction, and the vertical direction is taken as the Z direction. The Y axis is taken along a direction orthogonal to the X direction and the Z direction, and a direction orthogonal to the X direction and the Z direction is taken as the Y direction. The transporting direction of the mover 10 does not necessarily have to be a horizontal direction, but in this case, the transporting direction may be defined as the X direction in the same manner as the Y direction and the Z direction. Note that the X direction, the Y direction and the Z direction are not necessarily limited to the directions orthogonal to each other, but may be defined as directions intersecting each other.

The stator 20 has a plurality of coil units 100 and a plurality of auxiliary tooth units 110. FIG. 1A illustrates a case where the stator 20 includes four coil units 100a, 100b, 100c, 100d and three auxiliary tooth units 110a, 110b, 110c. The number of the coil units 100 and the number of the auxiliary tooth units 110 are not particularly limited, but may be changed in accordance with lengths of the transport path to transport the mover 10.

The plurality of coil units 100 and the plurality of auxiliary tooth units 110 are arranged along the X direction. FIG. 1A illustrates a case where the coil units 100 and the auxiliary tooth units 110 are alternately arranged in the X direction. In this case, the coil unit 100a, the auxiliary tooth unit 110a, the coil unit 100b, the auxiliary tooth unit 110b, the coil unit 100c, the auxiliary tooth unit 110c, and the coil unit 100d are arranged in this order along the X direction. Note that the coil units 100 and the auxiliary tooth units 110 do not necessarily have to be arranged alternately. The plurality of coil units 100 may be disposed so as to be continuously arranged along the X direction without passing through the auxiliary tooth units 110. Further, the auxiliary tooth units 110 may be disposed so as to be continuously arranged along the X direction without passing through the coil unit 100.

The coil unit 100 has a first stator yoke 103, a plurality of first teeth 101, and a plurality of coils 102. The first stator yoke 103 is a plate-like yoke arranged along the X direction which is the transporting direction of the mover 10 and the longitudinal direction. The first teeth 101 have a columnar body projecting downward from the lower surface of the first stator yoke 103. The plurality of first teeth 101 are installed on the lower surface of the first stator yoke 103 so as to be aligned along the X direction. The first teeth 101 are arranged at predetermined intervals in the X direction. The first stator yoke 103 and the first teeth 101 are composed of a magnetic body made from soft magnetic material. The coil 102 is wound around the first tooth 101. The plurality of coils 102 wound around the plurality of first teeth 101 are arranged so as to be aligned along the X direction that is the transporting direction of the mover 10. Each coil 102 has the first tooth 101 as a core magnetic material wound with the coil. FIG. 1A illustrates a case where each of the coil units 100a, 100b, 100c, and 100d has six first teeth 101 and are identical in structure to each other. It should be noted that the plurality of coil units 100 need not all have the same structure, and may include those having different sizes of the first stator yoke 103, numbers of the first tooth 101, and the like.

The auxiliary tooth unit 110 has a second stator yoke 113 and one or a plurality of second teeth 111. The second stator yoke 113 is a plate-like yoke along the X direction with the X direction, which is the transporting direction of the mover 10, as the longitudinal direction. The second teeth 111 have a columnar body projecting downward from the lower surface of the second stator yoke 113. If there is a plurality of second teeth 111, the plurality of second teeth 111 are installed on the lower surface of the second stator yoke 113 so as to be aligned along the X direction. The plurality of second teeth 111 are arranged at given intervals in the X direction. The second stator yoke 113 and the second teeth 111 are each composed of a magnetic body made from soft magnetic material. Unlike the first teeth 111, the second teeth 111 are not wound with a coil. FIG. 1A illustrates a case where the auxiliary tooth units 110a, 110c have a single second tooth 111a or a second tooth 111e, and the auxiliary tooth unit 110b has three second teeth 111b, 111c, 111d. The coil may be wound around the second teeth 111.

A plurality of coil units 100 and auxiliary tooth units 110 are arranged along the X direction that is the transporting direction. The coil unit 100a and the coil unit 100b are arranged to sandwich the auxiliary tooth unit 110a in the X direction. The coil unit 100a and the coil unit 100b are arranged so as to sandwich the auxiliary tooth unit 110a in the X direction. The coil unit 100b and the coil unit 100c are arranged to sandwich the auxiliary tooth unit 110b in the X direction.

It should be noted that the auxiliary tooth unit 110 does not necessarily have to be disposed between the two coil units 100, but may be disposed outside the coil units 100. For example, in the case shown in FIG. 1A, the auxiliary tooth unit 110 may be disposed on the left side of the coil unit 100a or on the right side of the coil unit 100d. Although it is desirable that the coil unit 100 and the auxiliary tooth unit 110 adjacent to each other are in contact with each other, there may be a gap between them. The first stator yoke 103 is preferably provided, but it does not have to be provided. It is preferable that the second stator yoke 113 is also provided, but it does not have to be provided.

In this way, in the X direction, the stator 20 includes a plurality of first regions in which the coil units 100 are installed, and a plurality of second regions in which the auxiliary tooth units 110 are installed. The length of a single first region in the X direction is longer than the length of any of the second regions in the X direction. The total length of the first regions in the X direction is also longer than the total length of the second regions in the X direction.

As shown in FIGS. 1B, 1C, and 1D, the mover 10 includes a magnet group composed of a plurality of permanent magnets 121, a mover yoke 120, and a holding portion 122. The plurality of permanent magnets 121 are arranged on the mover yoke 120 so as to form a magnet row in line along the X direction that is the longitudinal direction of the mover yoke 120. The plurality of permanent magnets 121 are arranged so that the polarities of surfaces adjacent to each other in the X direction are different from each other and the N pole and the S pole are alternately arranged. The plurality of permanent magnets 121 are arranged so as to face both or one of the coil units 100 and the auxiliary tooth unit 110 of the stator 20 in the Z direction. The holding portion 122 is configured to hold the workpiece 123, for example, on the lower side of the mover 10. It should be noted that the holding portion 122 only needs to be able to hold the workpiece 123 in the mover 10, and the place where the holding portion 122 holds the workpiece 123 and the holding mechanism are not particularly limited.

As shown in FIG. 1A, the mover 10 is disposed such that a plurality of permanent magnets 121 are opposed to both or one of the coil units 100 and the auxiliary tooth unit 110 with respect to the stator 20, and guided to travel along the X direction by a linear guide or the like (not shown). The workpiece 123 as an object is transported in the X direction along with the transportation of the mover 10 while being held by the holding portion 122 in the mover 10.

Further, the transport apparatus 1 according to the present embodiment includes a control unit 40 for controlling the transportation of the mover 10. The control unit 40 detects a position of the mover 10 using means for detecting positions such as a linear encoder, a laser length measuring instrument, or the like (not shown). In addition, the control unit 40 calculates the amount of current flowing in each coil 102 of the stator 20 in accordance with the detected position of the mover 10, and energizes each coil 102. Thus, the control unit 40 allows to generate, between the coil 102 and the permanent magnet 121 of the mover 10, a levitation force for levitating the mover 10 in the Z direction and a magnetic force for driving and running the mover 10 in the X direction. A magnetic force working as an attractive force is generated between the first tooth 101 of the coil unit 100 and the permanent magnet 121, and between the second tooth 111 of the auxiliary tooth unit 110 and the permanent magnet 121. In this way, the control unit 40 allows to transport the mover 10 along the X direction with floating in the Z direction while controlling the position and speed of the mover 10 to transport the workpiece 123.

In a transport apparatus using a movable magnet type linear motor, it is necessary to arrange a plurality of coils along a transport section. Therefore, it is not easy to change the layout of the production line including the transport apparatus. Therefore, in the movable magnet type linear transport apparatus as described in Japanese Patent Application Laid-Open No. 2015-50828, a stator in which a plurality of coils is unitized is arranged side by side in the transport direction. By changing the arrangement and combination of the unitized stator, the degree of design automation may be enhanced with respect to the layout of the production line and the work transport distance.

However, if the coils are unitized as described in Japanese Patent Application Laid-Open No. 2015-50828, the transport distance may not be an integral multiple of the length of the coil unit, and the coils may not be uniformly arranged. Further, if the coil is installed inside the vacuum chamber, it is not easy to arrange the coil in a section where the gate valve is located. In a section where there is a gap between the coil units, there is a possibility that the transport accuracy of the parts or workpieces held and transported by the mover is lowered. This is because the attractive force generated between the magnetic pole of the stator and the permanent magnet of the mover when the coil is not energized varies significantly.

On the other hand, in the transport apparatus 1 according to the present embodiment, the stator 20 includes a first region in which the coil unit 100 is installed, and a second region which is adjacent to the first region in the X direction and in which the auxiliary tooth unit 110 is installed. While the coil unit 100 has a plurality of first teeth 101 and a plurality of coils 102 wound around the first teeth 101, the auxiliary tooth unit 110 has a plurality of second teeth 111. Each of the plurality of second teeth 111 functions as a magnetic compensator for compensating a change in magnetic energy distribution characteristics formed by the permanent magnet 121 and the coil 102 in a first region where the coil unit 100 is installed. By the second tooth 111 functioning as a magnetic compensator, the torque distribution characteristic acting on the mover 10 formed by the plurality of coils 102. More specifically, the period of the torque variation may be held substantially constant.

Thus, in the present embodiment, in the second region where the coil 102 is not installed, the second teeth 111 compensate for the change in the magnetic energy distribution characteristics formed by the permanent magnet 121 and the coil 102, so that the mover 10 may be smoothly and stably transported.

Figure 2A:
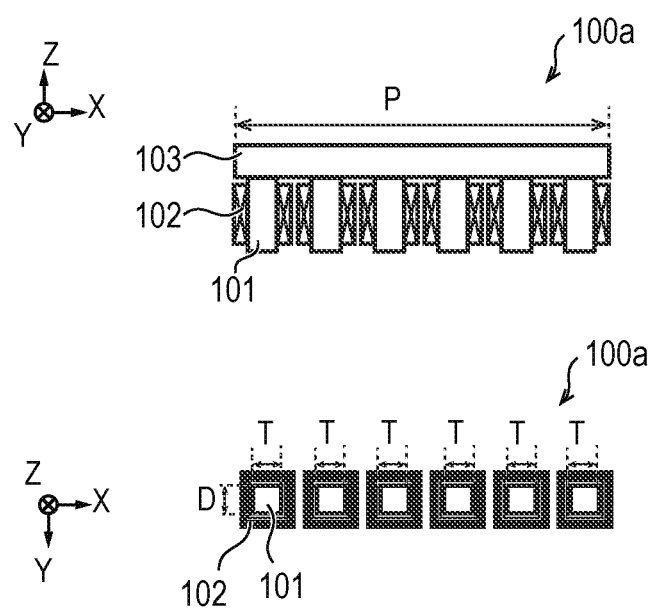
FIG. 2A is a diagram showing the tooth size of the coil unit in the transport apparatus according to the first embodiment of the present disclosure.
Figure 2B:
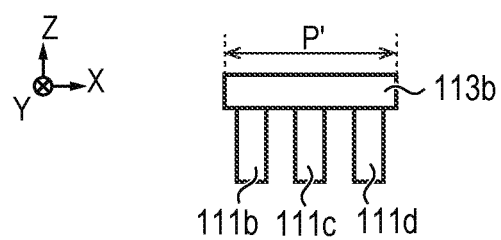
FIG. 2B is a diagram showing the size of the tooth unit in the transport apparatus according to the first embodiment of the present disclosure.
Figure 2B:
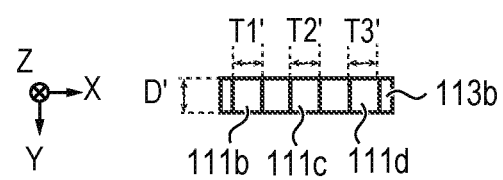

Next, the tooth sizes of the coil unit 100 and the auxiliary tooth unit 110 in the transport apparatus 1 according to the present embodiment will be described with reference to FIGS. 2A and 2B. FIG. 2A shows a side view and a bottom view of the coil unit 100 in the upper and lower stages, respectively. FIG. 2B shows a side view and a bottom view of the auxiliary tooth unit 110b in the upper and lower stages, respectively.

As shown in FIG. 2A, the first tooth 101 around which the coil 102 of the coil unit 100a is wound has a rectangular plane shape with a pair of sides extending to the X direction when planarly viewing from the Z direction. Here, the width of the first tooth 101 in the X direction is denoted by T, and the thickness in the Y direction is denoted by D. The length of the first stator yoke 103 in the X direction, which is the length in the longitudinal direction of the coil unit 100a, is denoted by P. The length P is also the length of the first region provided with the coil unit 100a in the X direction. The six first teeth 101 in the coil unit 100a have the same width T. The number of the first tooth 101 in the coil unit 100 is denoted by $n_T$ ($n_T$=6 in the case shown in FIG. 2A). Then, the total plane area S1 of the plurality of first teeth 101 in the coil unit 100a when planarly viewing from the Z direction is expressed by the following formula (1).

$$S_1 = n_T \cdot T \cdot D \tag{1}$$

As shown in FIG. 2B, each of the second teeth 110b, 111c, 111d in the auxiliary tooth unit 111b has a rectangular plane shape with a pair of sides extending to the X direction when planarly viewing from the Z direction. Here, the widths of the second teeth 111a, 111b and 111c in the X direction are represented by T1', T2' and T3', and the thicknesses are represented by D1', D2' and D3', respectively. The length of the second stator yoke 110a in the X direction, which is the length of the auxiliary tooth unit 113a in the longitudinal direction, is represented by P'. The length P' also corresponds to the length of the second region provided with the coil unit 100 in the X direction. Then, the sum S2 of the plane areas of the second teeth 111a, 111b, 111c in the auxiliary tooth unit 110a when planarly viewing from the Z direction is expressed by the following formula (2). In the following equation (2), Σ is a symbol representing the sum of n=1, 2 and 3.

$$S_2 = \Sigma(T_n' \cdot D_n') \tag{2}$$

When S1/S2 that is the ratio of S1 to S2, is set to α, and P/P' that is the ratio of P to P' is set to β, the ratio α and the ratio β satisfy the following relation from the viewpoint of smoothly and stably transporting the mover. That is, the ratio α and the ratio β preferably satisfy the following equation (3), more preferably satisfy the following equation (4), and more preferably satisfy the following equation (5).

$$0.5 \leq \alpha/\beta \leq 2 \tag{3}$$

$$0.75 \leq \alpha/\beta \leq 1.25 \tag{4}$$

$$0.9 \leq \alpha/\beta \leq 1.1 \tag{5}$$

In particular, it is most preferable that the ratio α and the ratio β satisfy the following equation (6).

$$\alpha/\beta = 1 \tag{6}$$

Equation (6) may be replaced by the following equation (7).

$$S_1 : S_2 = P : P' \tag{7}$$

Figure 3:
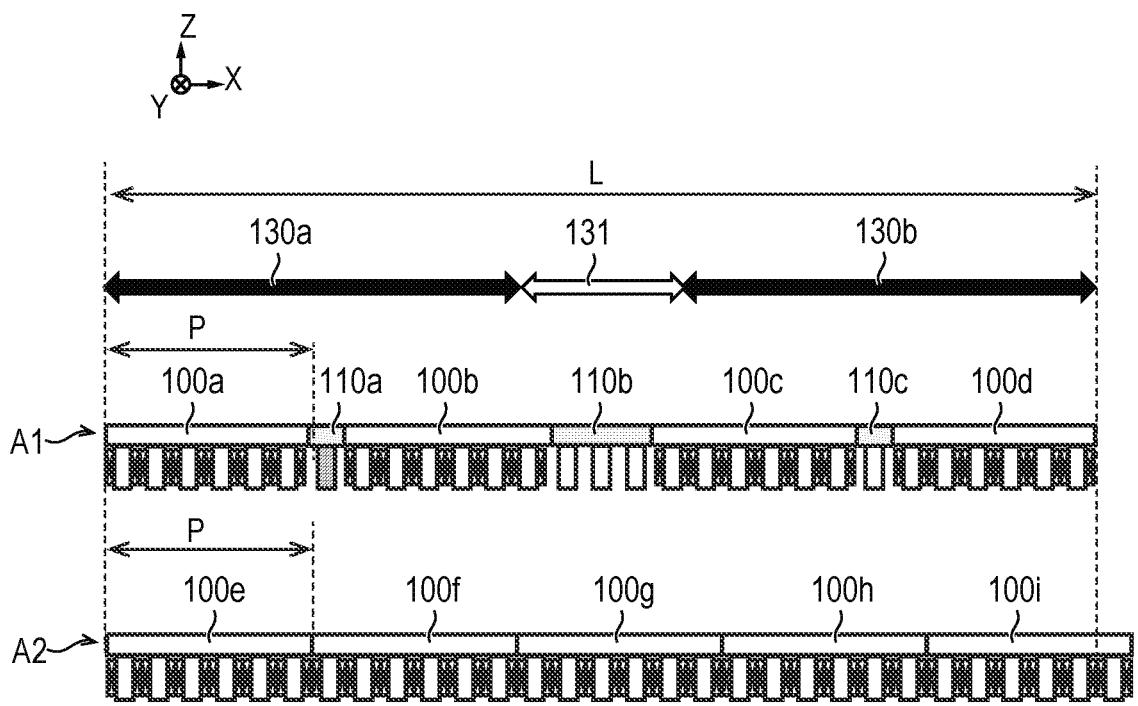
FIG. 3 is a diagram showing an example of the arrangement of the coil unit in the transport apparatus according to the first embodiment of the present disclosure.

FIG. 3 is a diagram illustrating an arrangement A1 of the coil unit 100 and the auxiliary tooth unit 110 according to the present embodiment. In FIG. 3, the arrangement A2 in which only the coil unit 100 is disposed is arranged on the lower side of the arrangement A1.

In the arrangement A1 shown in FIG. 3, a plurality of coil units 100 and a plurality of auxiliary tooth units 110 are arranged in combination. Thus, in the arrangement A1, the coil units 100a, 100b, 100c, and 100d and the auxiliary tooth units 110a, 110b, and 110c may be arranged so as to match the necessary transport distance L, which is the distance in the X direction required for transporting the mover 10.

The section of the necessary transport distance L includes acceleration/deceleration sections 130a and 130b where driving thrust is required for the mover 10, and a constant speed section 131 where less driving thrust is required compared to the acceleration/deceleration sections 130a and 130b. In the arrangement A1, the coil units 100 may be concentrated in the acceleration/deceleration sections 130a and 130b, and the auxiliary tooth unit 110 may be arranged in the constant speed section 131. Further, the coil unit 100 and the auxiliary tooth unit 110 may be arranged such that the auxiliary tooth units 110 occupy a greater length in the X direction corresponding to the constant speed section 131 than lengths in the X direction corresponding to the acceleration/deceleration sections 130a and 130b. Thus, in the arrangement A1, sufficient transport performance for transporting the mover 10 can be ensured.

In the arrangement A2 in which only the coil unit 100 is disposed, if a plurality of coil units 100 are arranged on a transport line having a necessary transport distance L, the necessary transport distance L may not be an integral multiple of the length P in the X direction of the coil unit 100 depending on the length of the necessary transport distance L. In this case, the coil unit 100 partially protrudes from the necessary transport distance L. For example, in the arrangement A2 shown in FIG. 3, the necessary transport distance L and the length P of the coil unit are in a relationship of 4P<L<5P, and the coil unit 100i partially protrudes from the necessary transport distance L. Therefore, in the arrangement A2 in which only the coil unit 100 is disposed, in order to uniformly arrange the coil unit 100, it is required to extend the necessary transport distance L with a margin, or to exclusively design and arrange another coil unit having a length different from the length P of the coil unit 100. However, in either case, the cost of the transport apparatus 1 is increased.

On the other hand, in the arrangement A1, since the auxiliary tooth unit 110 is arranged together with the coil unit 100, the coil unit 100 may be arranged without protruding from the necessary transport distance L. Therefore, according to the present embodiment, an increase in the cost of the transport apparatus 1 caused by the arrangement A2 can be avoided.

The plurality of coil units 100 and the plurality of auxiliary tooth units 110 may be disposed between the coil units 100 adjacent to each other in the X direction or between the coil units 100 and the auxiliary tooth units 110 adjacent to each other with a gap therebetween. However, in a section where there is a gap between the coil units 100, there is a possibility that the transport accuracy of the workpiece 123 during transportation is lowered. This is because the attractive force generated between the magnetic pole of the stator 20 and the permanent magnet of the mover 10 when the coil 102 is not energized varies significantly.

Figure 4A:
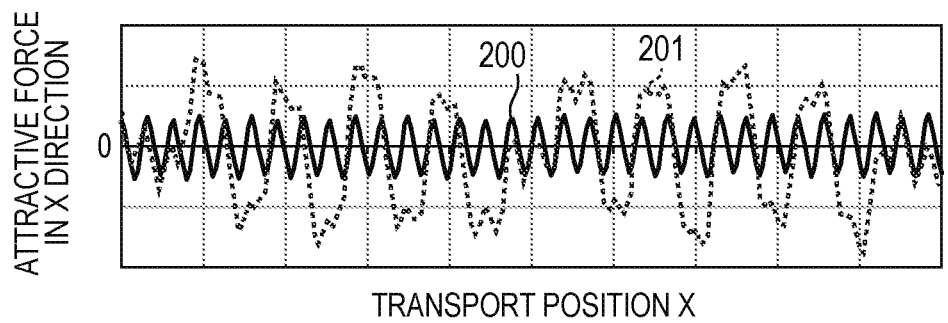
FIG. 4A is a view showing the effect of the transport apparatus on the variation of the attractive force according to the first embodiment of the present disclosure.
Figure 4B:
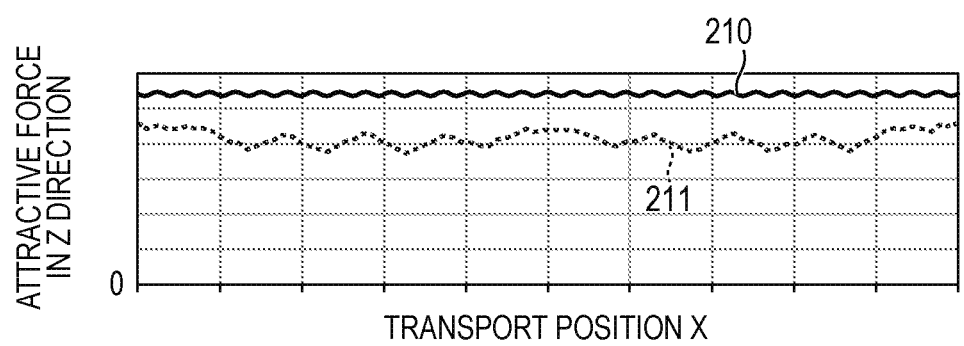
FIG. 4B is a view showing the effect of the transport apparatus on the variation of the attractive force according to the first embodiment of the present disclosure.

Next, the effect of the present embodiment on the attractive force variation will be described with reference to FIGS. 4A and 4B. FIGS. 4A and 4B show variations in the attractive force generated between the mover 10 and the stator 20 when the transport position X of the mover 10 is changed from one end to the other end of the section of the necessary transport distance L in a state where the coil 102 is not energized. FIG. 4A shows a variation of the attractive force in the X direction between the mover 10 and the stator 20. FIG. 4B shows a variation of the attractive force in the Z direction between the mover 10 and the stator 20. In FIGS. 4A and 4B, a case where the auxiliary tooth unit 110 is disposed between the coil units 100 in the arrangement A1 (a variation line 200, a variation line 210) is compared with a case where the auxiliary tooth unit 110 is not disposed (a variation line 201, a variation line 211). It is noted that a case where the auxiliary tooth unit 110 is not arranged indicates a case where the auxiliary tooth units 110a, 110b, 110c are not arranged in the arrangement A1.

As shown in FIG. 4A, if the auxiliary tooth unit 110 is disposed between the coil units 100, the variation line 200 indicating the variation of the attractive force in the X direction is kept within a constant variation range and is stable. The variation line 200 varies with a constant variation width because of the cogging caused in the non-energized state of the coil 102 due to the change of the magnetic poles by the first tooth 101, the second tooth 111 and the permanent magnet 121.

If the auxiliary tooth unit 110 is not disposed, the variation line 201 indicating the variation of the attractive force in the X direction has a larger cycle of variation than the variation line 200, and in the example shown in FIG. 4A, the variation of the attractive force becomes two times or more larger than the variation line 200. Since the variation of the attractive force becomes a disturbance force, it also becomes a factor for lowering the accuracy of the transporting position and the transporting speed of the mover 10.

Further, as shown in FIG. 4B, if the auxiliary tooth unit 110 is disposed between the coil units 100, the variation line 210 indicating the variation of the attractive force in the Z direction is stabilized by a constant variation width as in the X direction.

If the auxiliary tooth unit 110 is not disposed, the variation line 211 indicating the variation of the attractive force in the Z direction significantly changes according to the transport position X, and in the example shown in FIG. 4B, the variation of the attractive force is six times or more larger than the variation line 210. The variation of the attractive force in the Z direction reduces the positional accuracy and the attitude accuracy of the mover 10 in the Z direction depending on the rigidity of the guide mechanism, even if there is a guide mechanism for holding the mover 10. Furthermore, in case of the magnetic levitation type transport apparatus using the attractive force in the Z direction as the levitation force, there is a possibility that the workpiece 123 under transportation is tilted or falls due to lacking unstable levitation forces.

In the present embodiment, as described above, the variation of the attractive force may be suppressed in both the X direction and the Z direction. Thus, in the present embodiment, the torque distribution characteristics on the mover 10 formed by the plurality of coils 102, more specifically, the period of the torque variation may be held substantially constant. Therefore, according to the present embodiment, the mover may be smoothly and stably transported.

Second Embodiment

The transport apparatus according to the second embodiment of the present disclosure will be described with reference to FIGS. 5A to 5E. The components similar to those of the first embodiment are denoted by the same symbols, and the description thereof will be omitted or simplified.

As described in the first embodiment, the relationship between the coil unit 100 and the auxiliary tooth unit 110b preferably satisfies the equation (3), and most preferably satisfies the equation (6) which may be rewritten to the equation (7). In the present embodiment, an example of the coil unit 100a and the auxiliary tooth unit 110b satisfying the equation (7) will be described.

Figure 5A:
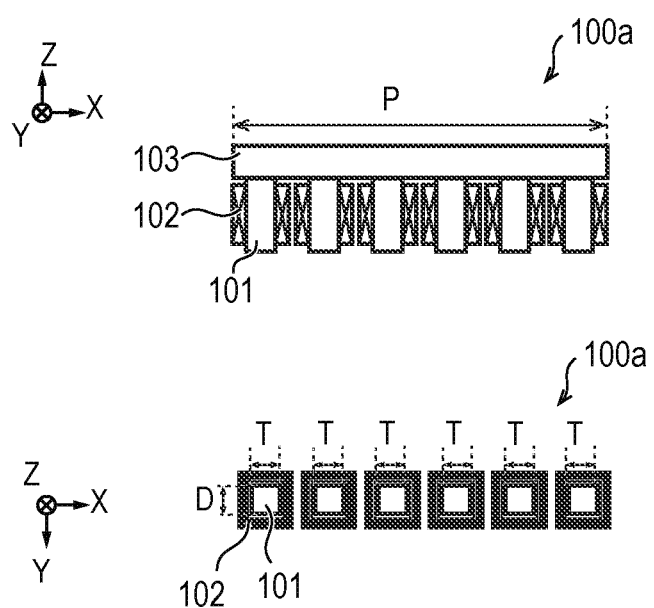
FIG. 5A is a schematic diagram showing the coil unit in the transport apparatus according to the second embodiment of the present disclosure.
Figure 5B:
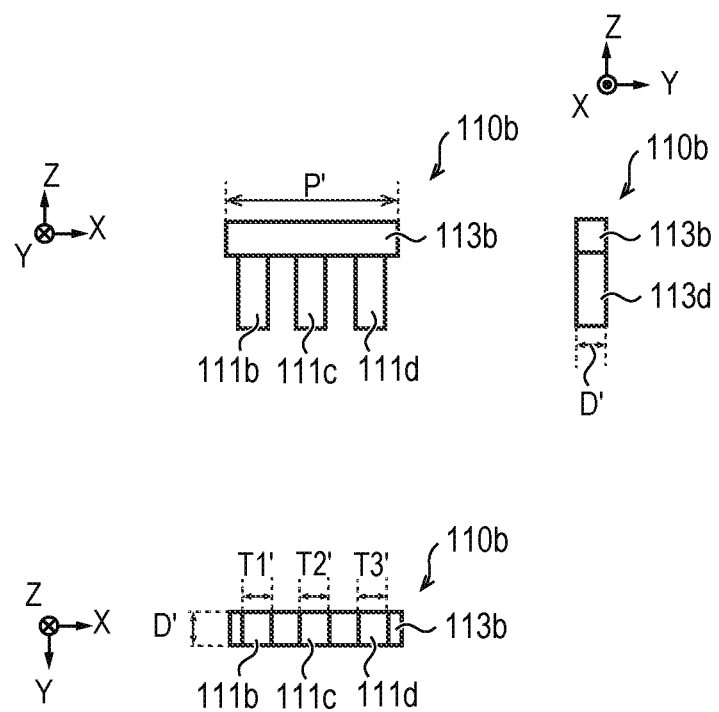
FIG. 5B is a schematic diagram showing the auxiliary tooth unit in the transport apparatus according to the second embodiment of the present disclosure.

FIG. 5A shows a side view of the coil unit 100a described in the first embodiment as viewed from the Y direction and a bottom view as viewed from the Z direction in the upper and lower stages, respectively. In the coil unit 100a shown in FIG. 5A, $n_T=6$ and P=12T. On the other hand, FIG. 5B shows a side view of the auxiliary tooth unit 110b described in the first embodiment as viewed from the Y direction, a bottom view as viewed from the Z direction, and a side view as viewed from the X direction on the upper left side, lower left side, and upper right side, respectively. In the auxiliary tooth unit 110b shown in FIG. 5B, the equations of P'=P/2, D'=D, and $T_1'=T_2'=T_3'=T$ are satisfied. In the coil unit 100a shown in FIG. 5A and the auxiliary tooth unit 110b shown in FIG. 5B, the left side of the equation (7) is $S_1:S_2=2:1$ and the right side is P:P'=2:1, and the equation (7) is satisfied.

Figure 5C:
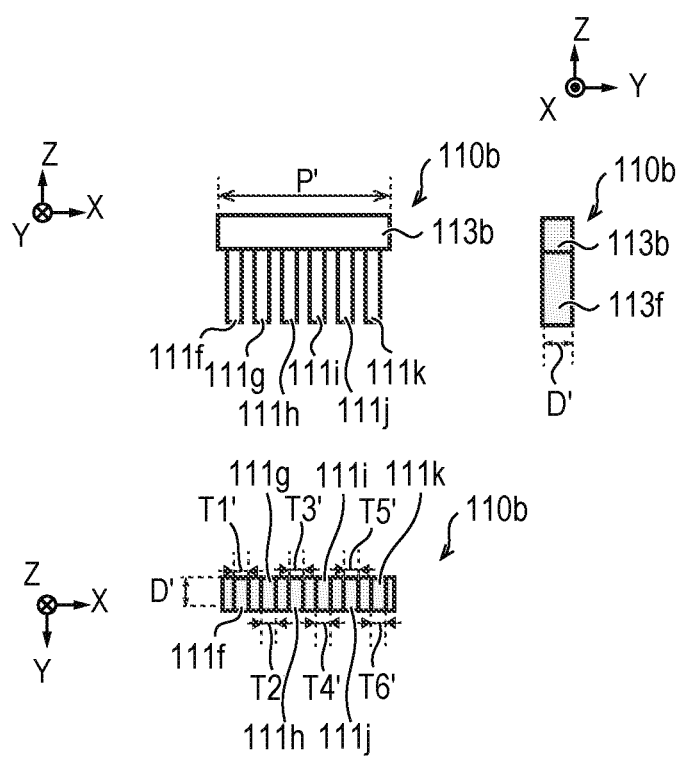
FIG. 5C is a schematic diagram showing the auxiliary tooth unit in the transport apparatus according to the second embodiment of the present disclosure.

FIG. 5C shows an example of the auxiliary tooth unit 110b in which the number of the second tooth 111 is doubled and the width of the second tooth 111 in the X direction is ½, as compared with the case shown in FIG. 5B. FIG. 5C shows a side view of the auxiliary tooth unit 110b viewed from the Y direction, a bottom view of the auxiliary tooth unit 110b viewed from the Z direction, and a side view of the auxiliary tooth unit 110b viewed from the X direction on the upper left side, lower left side, and upper right side, respectively. In the auxiliary tooth unit 110b shown in FIG. 5C, the equations of P'=P/2, D'=D, $T_1'=T_2'=T_3'=T_4'=T_5'=T_6'=T/2$ are satisfied. In both the coil unit 100a shown in FIG. 5A and the auxiliary tooth unit 110b shown in FIG. 5C, the left side of the equation (7) is $S_1:S_2=2:1$ and the right side is P:P'=2:1, and the equation (7) is satisfied.

Figure 5D:
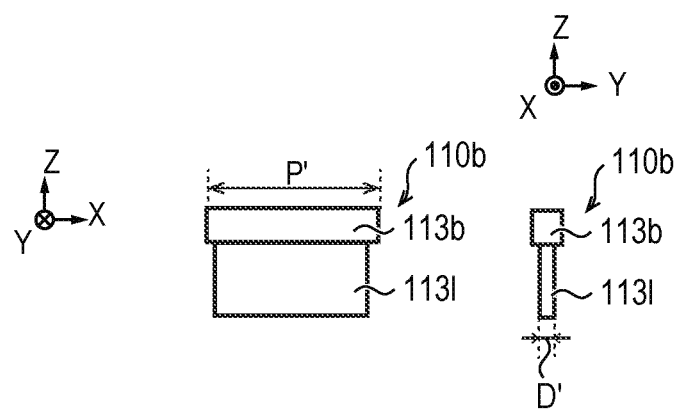
FIG. 5D is a schematic diagram showing the auxiliary tooth unit in the transport apparatus according to the second embodiment of the present disclosure.
Figure 5D:
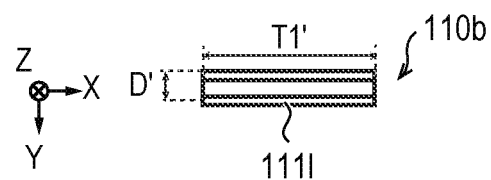

FIG. 5D shows an example of an auxiliary tooth unit 110b in which the number of second tooth 111 is set to 1, the width of the second tooth 111 in the X direction is widened, and the thickness of the second tooth 111 in the Y direction is set to ½ as compared with the case shown in FIG. 5B. FIG. 5D shows a side view of the auxiliary tooth unit 110b viewed from the Y direction, a bottom view of the auxiliary tooth unit 110b viewed from the Z direction, and a side view of the auxiliary tooth unit 110b viewed from the X direction on the upper left side, lower left side, and upper right side, respectively. In the auxiliary tooth unit 110b shown in FIG. 5D, the equations of P'=P/2, D'=D/2, and $T_1'=P'=6T$ are satisfied. In both the coil unit 100a shown in FIG. 5A and the auxiliary tooth unit 110b shown in FIG. 5D, the left side of the equation (7) is $S_1:S_2=2:1$ and the right side is P:P'=2:1, and the equation (7) is satisfied.

Figure 5E:
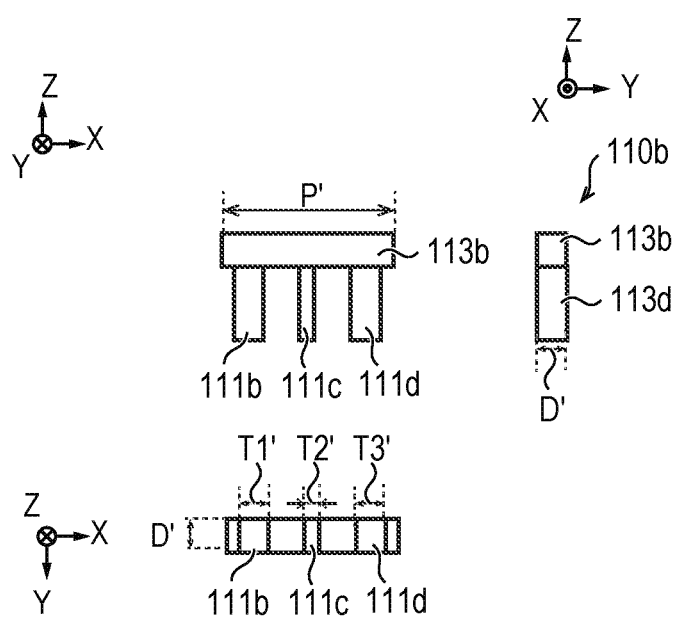
FIG. 5E is a schematic diagram showing the auxiliary tooth unit in the transport apparatus according to the second embodiment of the present disclosure.

FIG. 5E shows an example of the auxiliary tooth unit 110b in which the width of the central second tooth 111c is made narrower and the width of the second tooth 111b, 111d at both ends is made wider than in the case shown in FIG. 5B. FIG. 5E shows a side view of the auxiliary tooth unit 110b viewed from the Y direction, a bottom view of the auxiliary tooth unit 110b viewed from the Z direction, and a side view of the auxiliary tooth unit 110b viewed from the X direction on the upper left side, lower left side, and upper right side, respectively. In the auxiliary tooth unit 110b shown in FIG. 5E, the equations of P'=P/2, D'=D, $T_2'=T/2$, and $T_1'=T_3'=T·5/4$ are satisfied. In both the coil unit 100a shown in FIG. 5A and the auxiliary tooth unit 110b shown in FIG. 5E, the left side of the equation (7) is $S_1:S_2=2:1$ and the right side is P:P'=2:1, and the equation (7) is satisfied.

Thus, the auxiliary tooth unit 110b may change the number of the second tooth 111 and the width and thickness of the second tooth 111.

In FIGS. 5A to 5E, both of the first tooth 101 and the second tooth 111 when planarly viewed from the Z direction have a rectangular planar shape, but the present disclosure is not limited to the rectangular shape. The first tooth 101 and the second tooth 111 may have other planar shapes when viewed from the Z direction besides the rectangular shape, such as a circular planar shape or other polygonal shapes. The first tooth 101 and the second tooth 111 may have tapered shapes in which the sides thereof are inclined at predetermined angles with respect to the Z direction.

Figure 6A:
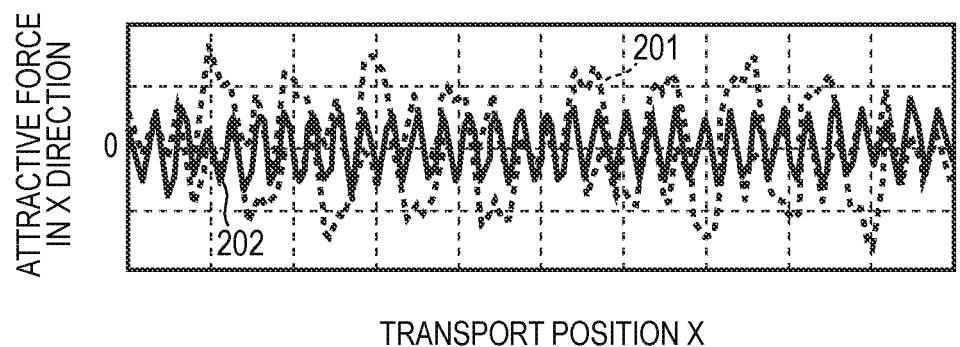
FIG. 6A is a view showing the effect of the transport apparatus on the variation in attractive force according to the second embodiment of the present disclosure.
Figure 6B:
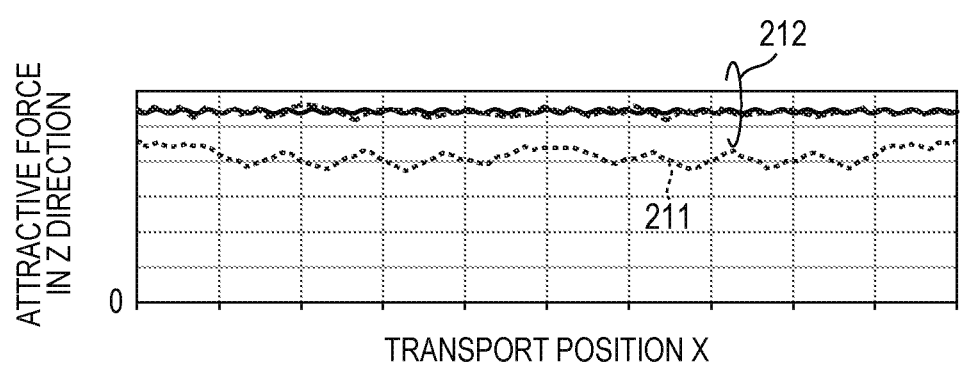
FIG. 6B is a view showing the effect of the transport apparatus according to the second embodiment of the present disclosure on a variation in attractive force.

Next, the effect of the present embodiment on the attractive force variation will be described with reference to FIGS. 6A and 6B. FIGS. 6A and 6B show, as in the cases shown in FIGS. 4A and 4B, variations in the attractive force generated between the mover 10 and the stator 20 when the transport position X of the mover 10 is changed from one end to the other end of the section of the necessary transport distance L in a state where the coil 102 is not energized. FIG. 6A shows the variation of the attractive force between the mover 10 and the stator 20 in the X direction. FIG. 6B shows a variation in the attractive force between the mover 10 and the stator 20 in the Z direction. In FIGS. 6A and 6B, a case where the auxiliary tooth unit 110b shown in FIGS. 5A to 5E is used (a variation line 202, a variation line 212) is compared with a case where the auxiliary tooth unit 110 is not arranged (the variation Line 201, the variation line 211).

The case where the auxiliary tooth unit 110 is not disposed is the same as the case shown in FIGS. 4A and 4B.

As shown in FIG. 6A, even if the auxiliary tooth unit 110b shown in FIGS. 5A to 5E is used, the variation line 202 indicating the variation of the attractive force in the X direction between the mover 10 and the stator 20 is all stable with a constant variation width. In any cases, the variation width of the variation line 202 is smaller than the variation width of the variation line 201 indicating the variation of the attractive force in case of not arranging the auxiliary tooth unit 110.

Further, as shown in FIG. 6B, the variation line 212 indicating the variation of the attractive force in the Z direction if the auxiliary tooth unit 110b shown in FIGS. 5A to 5E is used also has a constant variation width and is as stable as the variation width in the X direction. In any cases, the variation width of the variation line 212 is smaller than the variation width of the variation line 211 indicating the variation of the attractive force in case of not arranging the auxiliary tooth unit 110.

As shown in this embodiment, the configuration of the auxiliary tooth unit 110 may be changed. Even if the configuration is changed, the variation of the attractive force may be suppressed in both the X direction and the Z direction. Therefore, according to the present embodiment, the mover 10 may be smoothly and stably transported.

Third Embodiment

The transport apparatus according to the third embodiment of the present disclosure will be described with reference to FIGS. 7A and 7B. The components similar to those used in the first and second embodiments are denoted by the same symbols, and the descriptions thereof are omitted or simplified.

In the present embodiment, an example in which the transport apparatus 1 described in the all previous embodiments is applied to a vacuum apparatus for constituting a vacuum magnetic levitation transport apparatus will be described. In the case of a vacuum magnetic levitation transport apparatus, a coil unit is arranged in a vacuum chamber, and the mover is transported with magnetically levitating by an attractive force generated between the mover and the stator as a levitation force. In the vacuum magnetic levitation transport apparatus, if a gate valve or the like for opening and closing a gate at the boundary of mutually adjacent vacuum chambers is arranged, it is not possible to continuously arrange coil units without gaps. In the present embodiment, smoothly and stably transporting the mover 10 is realized even in a space 304 including a gate valve 302 that prevents the arrangement of the coil units without gaps.

Figure 7A:
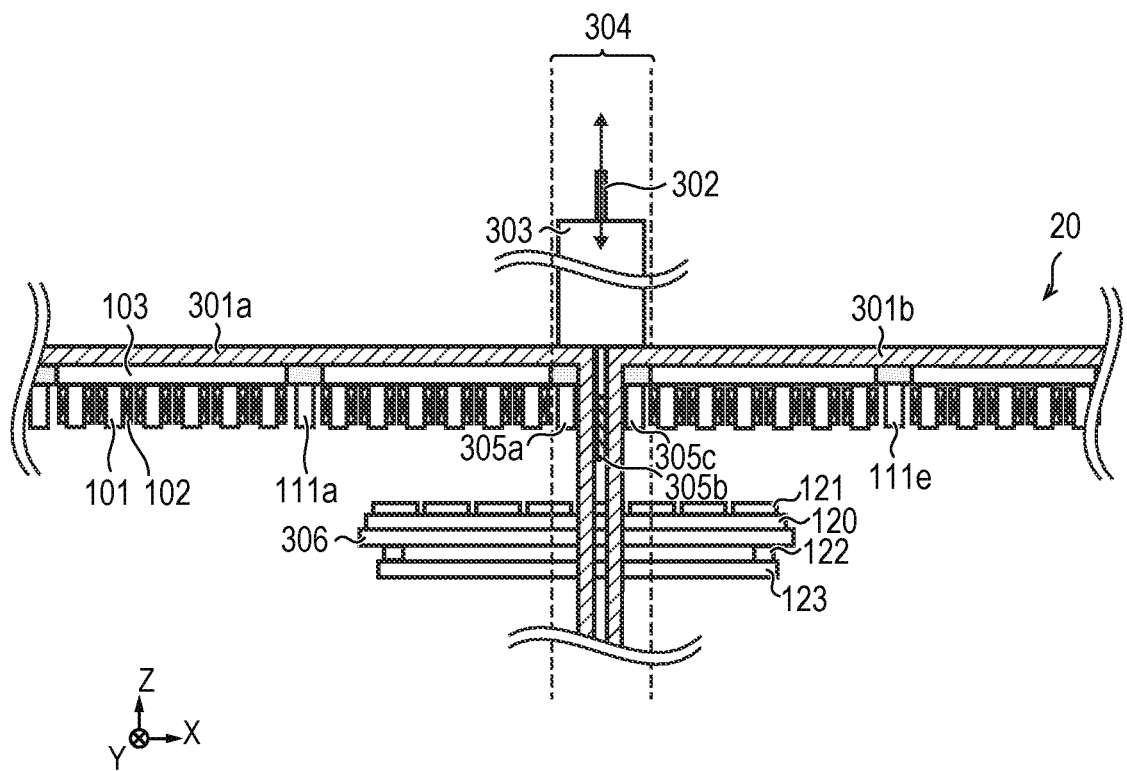
FIG. 7A is a schematic view showing an application example of the transport apparatus according to the third embodiment of the present disclosure to the vacuum apparatus.
Figure 7B:
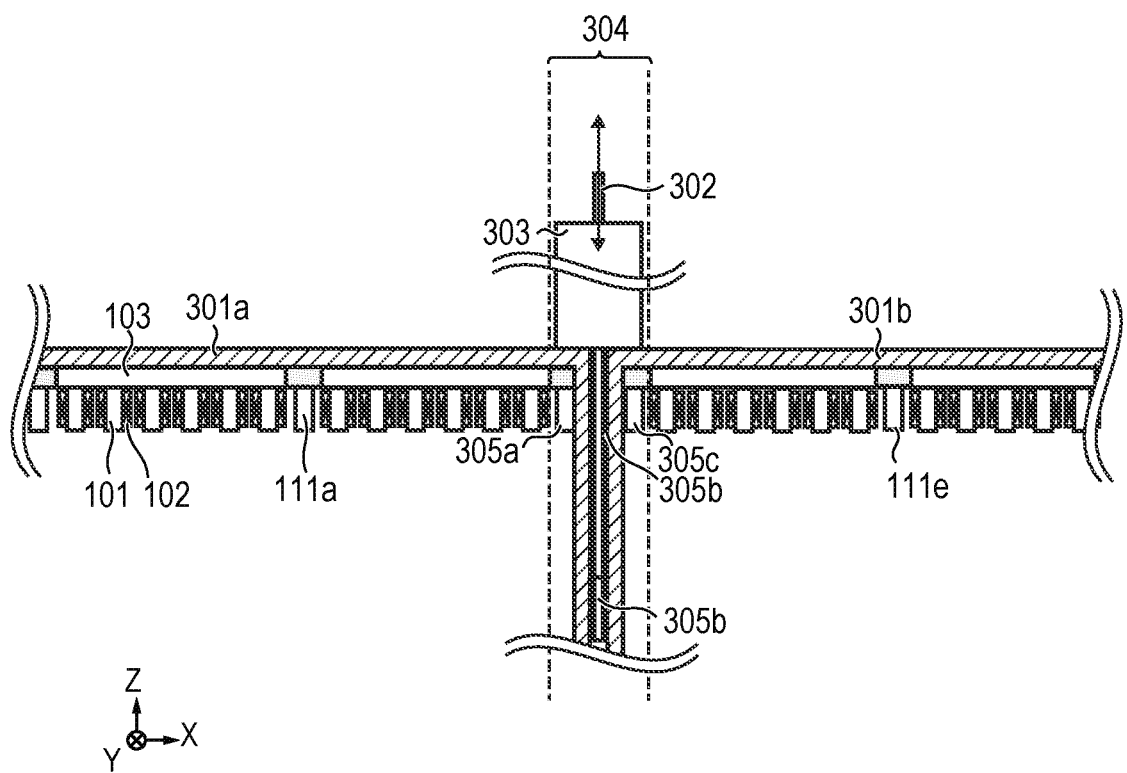
FIG. 7B is a schematic view showing an application example of the transport apparatus to the vacuum apparatus according to the third embodiment of the present disclosure.

FIGS. 7A and 7B are schematic diagrams showing an application example of the transport apparatus 1 to a vacuum apparatus. FIGS. 7A and 7B show a configuration in which vacuum chambers 301a and 301b, a gate valve 302, and a gate valve elevating portion 303 are added in addition to the configuration of the first embodiment.

The transport apparatus 1 is installed inside the vacuum chambers 301a and 301b. That is, the stator 20 is disposed inside the vacuum chambers 301a and 301b. The mover 10 is transported by the stator 20 inside the vacuum chambers 301a, 301b. The vacuum chambers 301a and 301b are connected or separably connected to each other with the transport apparatus 1 installed therein. The vacuum chambers 301a and 301b are connected to a vacuum pump (not shown) so as to be maintained at a proper degree of vacuum.

In the vacuum chambers 301a and 301b, for example, the workpiece 123 held by the transported mover 10 is processed by the processing device 30 (see FIG. 1A) to produce an article. As described in the first embodiment, the processing device 30 is, for example, a film forming device such as a vapor deposition device or a sputtering device for forming a film on a substrate that correspond to the workpiece 123.

The gate valve 302 and a gate valve elevating portion 303 are provided in the space 304 which is a connection part between the vacuum chamber 301a and the vacuum chamber 301b. The gate valve elevating portion 303 moves and elevates the gate valve 301 at a connection portion between the vacuum chamber 301a and the vacuum chamber 302b. The gate valve 302 is elevated and lowered by the gate valve elevating portion 303, and functions as a valve component for opening and closing the vacuum chambers 301a and 301b at the connection portion of the vacuum chambers 301a and 301b. That is, as shown in FIG. 7A, the gate valve 302 is moved up by the gate valve elevating portion 303 to open the vacuum chambers 301a and 301b on both sides, respectively, to connect them to each other. Further, as shown in FIG. 7B, the gate valve 302 is lowered by the gate valve elevating portion 303 to close the vacuum chambers 301a and 301b on both sides and separate the chambers from each other.

The space 304 is provided with second teeth 305a, 305b, 305c constituting a structure that functions similarly to the auxiliary tooth unit 110b of the first embodiment. The second teeth 305a, 305b, 305c correspond to the second tooth 111.

The second tooth 305a is disposed at the end of the vacuum chamber 301a on the side of the space 304 adjacent to the coil unit 100b. The second tooth 305b is installed at the end on the side of the space 304 adjacent to the coil unit 100b inside the vacuum chamber 301a. The second tooth 305a is mounted on the lower end of the gate valve 302.

As shown in FIG. 7B, the gate valve 302 is lowered at the timing of maintenance or the like to separate the vacuum chambers 301a and 301b from each other. As the gate valve 302 descends, the second tooth 302a installed at the lower end of the gate valve 305 also descends.

In one direction, while the mover 10 being transported, the gate valve 302 is elevated as shown in FIG. 7A to separate the vacuum chambers 301a and 301b from each other. If the gate valve 302 is elevated, the second tooth 305b is positioned between the second tooth 301a inside the vacuum chamber 305a and the second tooth 301c inside the vacuum chamber 305b, and are aligned with the second teeth 305a, 305c in the X direction. In this case, the second teeth 305a, 305b, 305c arranged in the X direction may function in the same manner as the auxiliary tooth unit 110b of the first embodiment.

The second teeth 305a, 305b, 305c are not wound with a coil. Of the second teeth 305a, 305b, 305c, the second tooth 305b installed in the space 304 is narrower and thinner in the X direction than the second tooth 305a, 305c installed in the vacuum chambers 301a, 301b, respectively. Therefore, the second tooth 305b can be attached to the lower end of the gate valve 302, and the space 304, which is a narrow space to which the vacuum chambers 301a and 301b are connected, may be elevated and lowered together with the gate valve 302.

Thus, in the present embodiment, the second tooth 304b is provided in a space 305. Therefore, in the present embodiment, the attractive force is generated between the second tooth 305b and the permanent magnet 121 in the space 304 to apply the attractive force also to the mover 10 transported and passed through the space 304. Therefore, according to the present embodiment, the mover 10 may be smoothly and stably transported even in the space 304 including the gate valve 302 installed.

In the present embodiment, the gate valve 302 may be stopped halfway between the highest position and the lowest position in the Z direction. Thus, the distance between the permanent magnet 121 of the mover 10 passing through the space 304 and the second tooth 305a may be changed and adjusted. By adjusting the distance between the permanent magnet 121 and the second tooth 305b, the attractive force generated between the mover 10 and the stator 20 may be adjusted.

Fourth Embodiment

The transport apparatus according to the fourth embodiment of the present disclosure will be described with reference to FIGS. 8A to 9. The components similar to those in the first to third embodiments are denoted by the same symbols, and description thereof will be omitted or simplified.

In this embodiment, the transport apparatus capable of driving the mover 10 in the Y direction will be described. FIGS. 8A to 8E show the mover 10 and the stator 20 in the transport apparatus according to the present embodiment. FIG. 8A is a top view showing the mover 10 viewed from the Z direction. FIG. 8B is a side view showing the mover 10 viewed from the Y direction. FIG. 8C is a side view showing the mover 10 viewed from the X direction. FIG. 8D is a side view showing the stator 20 viewed from the Y direction. FIG. 8E is a bottom view showing the stator 20 viewed from the Z direction. FIG. 8F is a side view showing the stator 20 viewed from the X direction.

The basic configuration of the transport apparatus according to the present embodiment is the same as that of the transport apparatus 1 according to the first embodiment. In addition to the structure of the transport apparatus 1 according to the first embodiment, the transport apparatus according to the present embodiment further has a structure for driving the mover 10 in the Y direction.

Figure 8A:
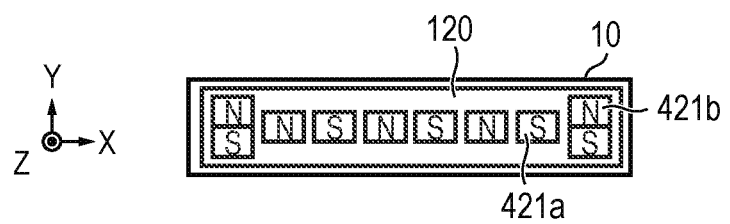
FIG. 8A is a schematic view showing the transport apparatus according to the fourth embodiment of the present disclosure.
Figure 8B:
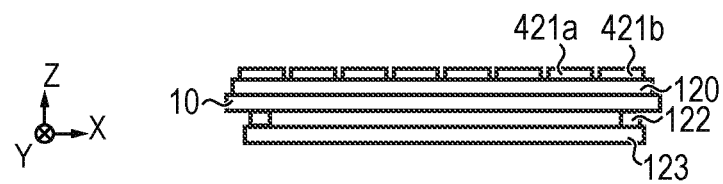
FIG. 8B is a schematic view showing the transport apparatus according to the fourth embodiment of the present disclosure.
Figure 8C:
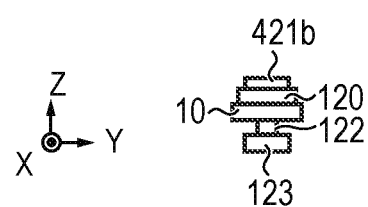
FIG. 8C is a schematic view showing the transport apparatus according to the fourth embodiment of the present disclosure.
Figure 8D:
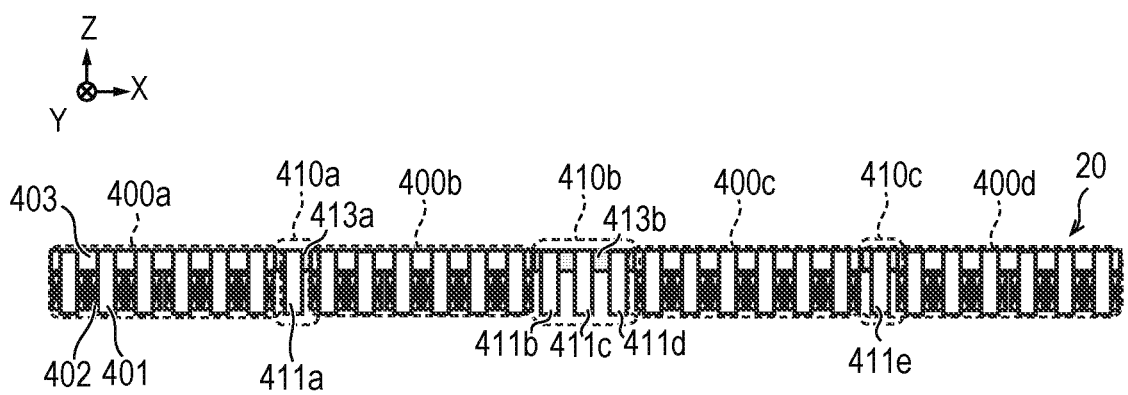
FIG. 8D is a schematic view showing the transport apparatus according to the fourth embodiment of the present disclosure.
Figure 8E:
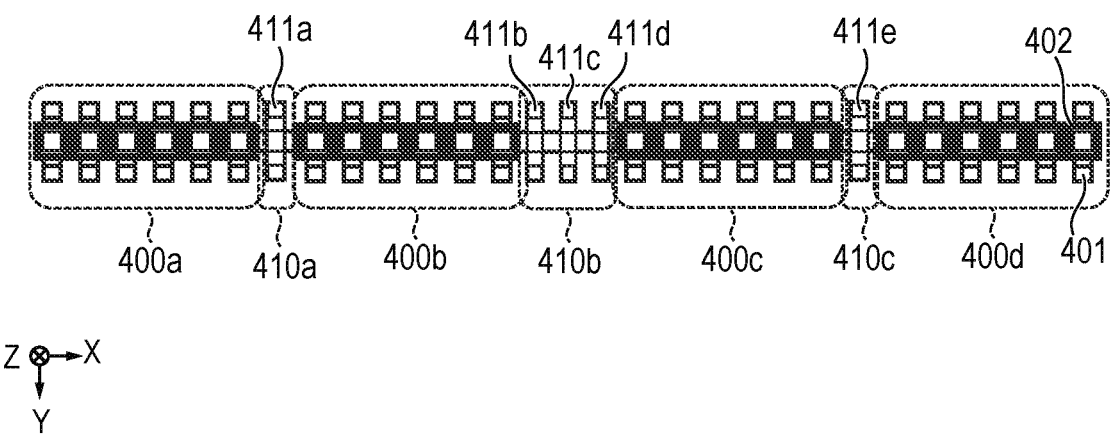
FIG. 8E is a schematic view showing the transport apparatus according to the fourth embodiment of the present disclosure.
Figure 8F:
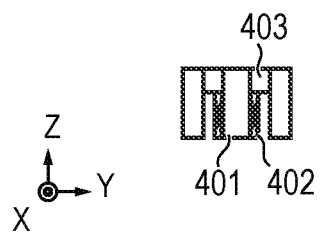
FIG. 8F is a schematic view showing the transport apparatus according to the fourth embodiment of the present disclosure.

As shown in FIGS. 8A to 8C, the mover 10 includes a magnet group including a plurality of permanent magnets 421a for driving in the X direction, a magnet group including a plurality of permanent magnets 421b for driving in the Y direction, the mover yoke 120, and the holding portion 122.

The plurality of permanent magnets 421a are arranged on the mover yoke 120 so as to form a magnet row in line along the X direction which is the longitudinal direction of the mover yoke 120. The plurality of permanent magnets 421a are arranged so that the polarities of the surfaces adjacent to each other in the X direction are different from each other and the N pole and the S pole are alternately arranged.

The plurality of permanent magnets 421b are arranged on the mover yoke 421 so as to form a magnet row in a line along the Y direction which is the short side direction of the mover yoke 120 on both sides of the magnet row in the X direction of the permanent magnet row 120a. The plurality of permanent magnets 421a are arranged so that the polarities of surfaces adjacent to each other in the Y direction are different from each other and the N pole and the S pole are alternately arranged.

As shown in FIGS. 8D, 8E and 8F, the stator 20 includes a plurality of coil units 400 and a plurality of auxiliary tooth units 410. FIGS. 8D and 8E illustrate a case of including four coil units 400a, 400b, 400c and 400d and three auxiliary tooth units 410a, 410b and 410c.

The coil unit 400 has a first stator yoke 403 corresponding to the coil unit 100 of the first embodiment and corresponding to the first stator yoke 103, and a plurality of first teeth 401 corresponding to the plurality of first teeth 101. The coil unit 400 has a plurality of coils 402 corresponding to the plurality of coils 102. However, in the present embodiment, in order to further increase the thrust of the plurality of permanent magnets 421b for driving in the Y direction, the first tooth 401 includes three teeth arranged in the Y direction as magnetic bodies, and are of the "E" shape with the right side of the character "E" directed downward in the Y direction. The coil 402 is wound around the central tooth of the first tooth 401. The first tooth 401 may have three tooth portions but also may have more or less tooth portions arranged along the Y direction. The tooth around which the coil 402 is wound does not necessarily have to be the central tooth, but may be wound around any of the plurality of teeth.

The auxiliary tooth unit 410 includes a second stator yoke 413 corresponding to the auxiliary tooth unit 110 of the first embodiment and corresponding to the second stator yoke 113, and a plurality of second teeth 411 corresponding to the plurality of second teeth 111. However, in the present embodiment, the second teeth 411, like the first tooth 401, have three teeth arranged in the Y direction as magnetic material portions, and are of the "E" shape with the right side of the character "E" directed downward in the Y direction. Unlike the first tooth 401, the second tooth 411 does not have a coil wound around any of the tooth. The second tooth 411 may have three teeth but may also have a plurality of teeth more or less than three arranged along the Y direction. FIGS. 8D and 8B illustrate a case where the auxiliary tooth units 410a, 410c have a single second tooth 411a, or a second tooth 411e, and the auxiliary tooth unit 410b has three second teeth 411b, 411c, 411d. A coil may be wound around the central tooth portion of the second tooth 411.

FIG. 9 shows a side view of the auxiliary tooth unit 410b viewed from the Y direction, a bottom view of the auxiliary tooth unit 410b viewed from the Z direction, and a side view of the auxiliary tooth unit 410b viewed from the X direction on the upper left side, the lower left side, and the upper right side, respectively. As shown in FIG. 9, in the auxiliary tooth unit 410b, each of the second teeth 411b, 411c, and 411d has three teeth arranged along the Y direction, and is of an "E" shape with the right side of the character directed downward in the direction.

As in the present embodiment, even in the transport apparatus operable to drive the mover 10 in the Y direction, the auxiliary tooth unit 410 may be installed to stabilize the attractive force generated between the mover 10 and the stator 20 during transportation. Therefore, according to the present embodiment, in the transport apparatus operable to drive the mover 10 also in the Y direction, the mover 10 may be transported smoothly and stably.

In the first embodiment, the permanent magnets 421a and 421b may be provided in the mover 10 in the same manner as in the present embodiment.

The transport apparatus according to the present embodiment may also be applied to a vacuum apparatus to constitute a vacuum magnetic levitation transport apparatus.

Modified Embodiments

The present disclosure is not limited to the above embodiments, and various modifications are possible. For example, in the above embodiment, a case where a single row of magnets including a plurality of permanent magnets 121 is arranged in the mover 10 and a single row of coils including a plurality of coils 102 is arranged in the stator 20 has been described as an example. However, the present disclosure is not limited thereto. The number of rows of magnets including a plurality of permanent magnets 121 and the number of rows of coils including a plurality of coils 102 opposed thereto may be more two or more, and they may be the same as each other.

In the above embodiment, a case where a single row of permanent magnets 421a is arranged in the mover 10 and a single row of coils 402 is arranged in the stator 20 has been described as an example. However, the present disclosure is not limited thereto. The number of rows of magnets including a plurality of permanent magnets 421a and the number of rows of coils including a plurality of coils 402 opposed thereto may be two or more, and they may be the same as each other. In addition, a magnet row including a plurality of permanent magnets 421b may be arranged on both end sides in the X direction of each row or a part of rows of multiple rows of magnets including multiple permanent magnets 421a.

Further, in a manufacturing system for manufacturing an article such as an electronic device, the transport apparatus according to the present disclosure may be used as a transport apparatus for transporting a workpiece together with a carrier to a work area of each processing device such as a machine tool for performing each working process for the workpiece to be an article. The processing device for performing the working processes may be any device such as a film forming device for forming a thin film on the workpiece, a device for assembling components on the workpiece, a device for performing coating, and the like. The article to be manufactured is not limited to a specific article, but may be any parts.

In this manner, the workpiece is transported to the work area by using the transport apparatus according to the present disclosure, and the working process is performed on the workpiece transported to the work area to manufacture the article.

Other Embodiments

Embodiment (s) of the present disclosure can also be reformed by a computer of a system or device that reads out and executes computer executable instructions (e.g., one or more programs) recorded on a storage medium (which may also be referred to more fully as a 'non-transitory computer-readable storage medium') to perform the functions of one or more of the above-described subjects (s) and/or that includes one or more circuits (e.g., application specific integrated circuit (ASIC)) for performing the functions of one or more of the above-described subjects (s), and by a method performed by the computer of the system or device by, for example, reading out and executing the computer executable instructions from the storage medium to perform the functions of one or more of the above—described item (s) and/or controlling the one or more circuits to perform the functions of one or more of the above—described item (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to experimental implications, it is to be understood that the investment is not limited to the disclosed experimental implications. The scope of the following claims is to be accepted the broadcast interpretation so as to encompass all such modifications and equivalent structures and functions.

This application claims the benefit of Japanese Patent Application No. 2020-181876, filed Oct. 29, 2020, which is hereby incorporated by reference herein in its entirety.

What is claimed is:

1. A transport apparatus comprising:
a stator including a plurality of coils arranged along a first direction; and
a mover including a first magnet group having a plurality of magnets arranged along the first direction, the plurality of magnets arranged to face the plurality of coils in a second direction crossing the first direction,
wherein the mover is driven toward the first direction by a magnetic force generated between the magnets and the coils,
wherein the stator includes a first region in which the plurality of coils is arranged at given intervals and a second region adjacent to the first region,
wherein a magnetic compensator is arranged in the second region for compensating changes in magnetic energy distribution characteristics formed by the magnets and the coils in the first region, and
wherein the coil arranged in the first region includes a core magnetic body as a core,
wherein the following equation is satisfied:

$$0.5 \leq \alpha/\beta \leq 2$$

where:
$\alpha$ represents a ratio of a plane area of the core magnetic body planarly viewing from the second direction to a plane area of the magnetic compensator planarly viewing from the second direction; and
$\beta$ represents a ratio of a length of the first region in the first direction to a length of the second region in the first direction.

2. The transport apparatus according to claim 1, wherein the magnetic compensator includes a plurality of magnetic compensators,
wherein the plurality of magnetic compensators is arranged in the first direction at given intervals.

3. The transport apparatus according to claim 1, wherein the first region includes a plurality of first regions, and
wherein the second region is arranged between the plurality of first regions.

4. The transport apparatus according to claim 1, wherein a length of the first region in the first direction is longer than a length of the second region in the first direction.

5. A processing system comprising:
the transport apparatus of claim 1; and
a processing device configured to perform processing to a workpiece transported by the mover.

6. A method for manufacturing an article comprising:
transporting a workpiece using the transport apparatus of claim 1; and
performing processing to the transported workpiece to manufacture an article.

7. A transport apparatus comprising:
a stator including a plurality of coils arranged along a first direction; and
a mover including a first magnet group having a plurality of magnets arranged along the first direction, the plurality of magnets arranged to face the plurality of coils in a second direction crossing the first direction,
wherein the mover is driven toward the first direction by a magnetic force generated between the magnets and the coils,
wherein the stator includes a first region in which the plurality of coils is arranged at given intervals and a second region adjacent to the first region,
wherein a magnetic compensator is arranged in the second region for compensating changes in magnetic energy distribution characteristics formed by the magnets and the coils in the first region, and
wherein the mover includes a second magnet group having a plurality of magnets arranged along a third direction crossing the first and second directions.

8. The transport apparatus according to claim 7, wherein the coil arranged in the first region is wound around one of a plurality of first magnetic portions arranged in the third direction at given intervals.

9. The transport apparatus according to claim 7, wherein the magnetic compensator includes a plurality of second magnetic portions arranged in the third direction at given intervals.

10. The transport apparatus according to claim 7,
wherein the first region includes a plurality of first regions, and
wherein the second region is arranged between the plurality of first regions.

11. The transport apparatus according to claim 7, wherein a length of the first region in the first direction is longer than a length of the second region in the first direction.

12. A processing system comprising:
the transport apparatus of claim 7; and
a processing device configured to perform processing to a workpiece transported by the mover.

13. A method for manufacturing an article comprising:
transporting a workpiece using the transport apparatus of claim 7; and
performing processing to the transported workpiece to manufacture an article.

14. A vacuum apparatus comprising:
a vacuum chamber;
a valve portion configured to open and close the vacuum chamber; and
a transport apparatus arranged inside the vacuum chamber, the transport apparatus comprising:
a stator including a plurality of coils arranged along a first direction; and
a mover including a first magnet group having a plurality of magnets arranged along the first direction, the plurality of magnets arranged to face the plurality of coils in a second direction crossing the first direction,
wherein the mover is driven toward the first direction by a magnetic force generated between the magnets and the coils,
wherein the stator includes a first region in which the plurality of coils is arranged at given intervals and the valve portion adjacent to the first region, and
wherein a magnetic compensator is arranged in the valve portion for compensating changes in magnetic energy distribution characteristics formed by the magnets and the coils in the first region.

15. The vacuum apparatus according to claim 14, wherein the coil arranged in the first region includes a core magnetic body as a core,
wherein the following equation is satisfied:

$$0.5 \le \alpha/\beta \le 2$$

where:
$\alpha$ represents a ratio of a plane area of the core magnetic body planarly viewing from the second direction to a plane area of the magnetic compensator planarly viewing from the second direction; and
$\beta$ represents a ratio of a length of the first region in the first direction to a length of the valve portion in the first direction.

16. The vacuum apparatus according to claim 14, wherein the magnetic compensator includes a plurality of magnetic compensators,
wherein the plurality of magnetic compensators is arranged in the first direction at given intervals.

17. The vacuum apparatus according to claim 14, wherein the mover includes a second magnet group having a plurality of magnets arranged along a third direction crossing the first and second directions.

18. The vacuum apparatus according to claim 17, wherein the coil arranged in the first region is wound around one of a plurality of first magnetic portions arranged in the third direction at given intervals.

19. The vacuum apparatus according to claim 17, wherein the magnetic compensator includes a plurality of second magnetic portions arranged in the third direction at given intervals.

20. The vacuum apparatus according to claim 14,
wherein the first region includes a plurality of first regions, and
wherein the valve portion is arranged between the plurality of first regions.

21. The vacuum apparatus according to claim 14, wherein a length of the first region in the first direction is longer than a length of the valve portion in the first direction.

22. A processing system comprising:
the vacuum apparatus of claim 14; and
a processing device arranged in the vacuum apparatus and configured to perform processing to a workpiece transported by the mover.

23. A method for manufacturing an article comprising:
transporting a workpiece using a transport apparatus arranged in the vacuum apparatus of claim 14; and
forming a film on the transported workpiece in the vacuum apparatus to manufacture an article.

* * * * *